United States Patent
Battles et al.

(10) Patent No.: US 10,197,987 B2
(45) Date of Patent: Feb. 5, 2019

(54) USE OF MANUFACTURING COMPOUNDS TO CREATE FIDUCIAL MARKS

(71) Applicant: The Boeing Company, Chicago, IL (US)

(72) Inventors: Craig F. Battles, Seattle, WA (US); Gregg W. Podnar, Seattle, WA (US); Kurt Webster, Los Gatos, CA (US)

(73) Assignee: The Boeing Company, Chicago, IL (US)

( * ) Notice: Subject to any disclaimer, the term of this patent is extended or adjusted under 35 U.S.C. 154(b) by 569 days.

(21) Appl. No.: 14/836,384

(22) Filed: Aug. 26, 2015

(65) Prior Publication Data

US 2017/0060115 A1 Mar. 2, 2017

(51) Int. Cl.
*G05B 19/402* (2006.01)
(52) U.S. Cl.
CPC .. *G05B 19/402* (2013.01); *G05B 2219/35339* (2013.01); *G05B 2219/45067* (2013.01); *G05B 2219/45071* (2013.01)
(58) Field of Classification Search
CPC ........ G05B 19/402; G05B 2219/35339; G05B 2219/45071; G05B 2219/45067
See application file for complete search history.

(56) References Cited

U.S. PATENT DOCUMENTS

| | | | | |
|---|---|---|---|---|
| 4,380,696 A | * | 4/1983 | Masaki .................. | B25J 19/023 219/124.34 |
| 4,417,127 A | * | 11/1983 | Nachev ................ | B23Q 35/128 219/124.34 |
| 4,568,816 A | * | 2/1986 | Casler, Jr. .......... | G05B 19/4083 219/124.34 |
| 4,916,286 A | * | 4/1990 | Sarugaku ............... | B23K 9/095 219/124.34 |
| 5,083,073 A | * | 1/1992 | Kato ...................... | B25J 9/1697 318/568.13 |
| 5,624,588 A | * | 4/1997 | Terawaki ............. | B23K 9/1272 219/124.34 |
| 5,841,098 A | * | 11/1998 | Gedrat ................... | B23K 26/04 219/121.63 |
| 6,430,472 B1 | * | 8/2002 | Boillot ................. | G05B 19/056 219/121.61 |
| 2002/0113198 A1 | * | 8/2002 | Bieman ................. | B05C 5/0216 250/221 |
| 2003/0068518 A1 | * | 4/2003 | Ando ....................... | B23K 9/04 428/608 |
| 2005/0041852 A1 | * | 2/2005 | Schwarz .............. | B23K 9/0956 382/152 |
| 2006/0049158 A1 | * | 3/2006 | Schurmann .......... | B23K 9/0956 219/121.83 |
| 2007/0292629 A1 | * | 12/2007 | Linnenkohl ............ | G01N 21/88 427/466 |

* cited by examiner

*Primary Examiner* — Bitew A Dinke
(74) *Attorney, Agent, or Firm* — Miller, Matthias & Hull LLP

(57) ABSTRACT

A robotic tool is positioned relative to a feature of a component during a manufacturing process. The tool may be used to perform a manufacturing operation on the component. The tool is also be used to dispose a fiducial mark with a known registration to the feature, even if the feature is subsequently obscured. The position of tools for subsequent manufacturing operations are then set relative to the fiducial mark.

9 Claims, 6 Drawing Sheets

USE OF MANUFACTURING COMPOUNDS TO CREATE FIDUCIAL MARKS

FIELD

This disclosure relates generally to aircraft manufacture and more particularly to creating fiducial marks during assembly of aircraft components.

BACKGROUND

Aircraft manufacturing processes have relied on mechanical fixtures to hold components being assembled and to align tools that are performing manufacturing operations on the components. However, such fixtures are not only costly to design and build, but are often specific to a particular model or variation of that component, requiring multiple fixtures to be designed, built, stored, and retrieved for use.

Increasingly, robots are being used to perform manufacturing functions that previously required such mechanical fixtures. However, the accurate location of a tool may rely on fiducial marks such as features or indices in the component that can become obscured as fillers or coatings are subsequently applied.

Fiducial marks are frequently used by machine vision systems to register tools. However, fiducial marks applied to individual piece parts or subassemblies during their manufacture may have one or more of the following deficiencies:

1) When added at the piece-part stage, the marks cannot be placed in locations that compensate for future tolerance buildup that may occur as a result of subsequent assembly steps. This results in a mark being placed within specification in the piece part's coordinate system but does not accurately represent a position in the assembly's coordinate system.

2) Placement of the fiducial markers adds a step to the creation of the piece-part.

3) The fiducial marker itself may need to withstand subsequent process steps such as annealing so use of a specialized compound could be necessary for the marker to survive certain process steps.

4) The material used to place the fiducial marker must be approved for any applicable regulatory or process standards.

SUMMARY

In an embodiment, a method of creating fiducial marks on a component during a manufacturing process includes positioning a tool relative to a reference location on the component, and using the tool, disposing a compound on the component at a first location relative to the reference location. The method can continue by moving the tool to a second location having a predetermined spatial relationship to the reference location and, using the tool, disposing additional compound to create a fiducial mark on the component at the second location.

In another embodiment, a system for performing manufacturing operations on a component includes a tool adapted to dispose a compound on the component, a sensing tool that captures information about a feature on the component, and a controller. The controller is configured to determine a first location on the component using the information about the feature, move the tool to the first location, and cause the tool to dispose the compound on the component at the first location. The controller is configured to cause the tool to dispose a fiducial mark on the component at a second location with a known spatial relationship to the feature of the component.

In yet another embodiment, a method of manufacturing a wing of an airplane includes identifying a first location on the wing and performing a manufacturing operation using a tool at a second location with a fixed spatial relationship to the first location. The method also includes moving the tool to a second location with a known spatial relationship to the first location and creating a fiducial mark at the second location using the tool.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
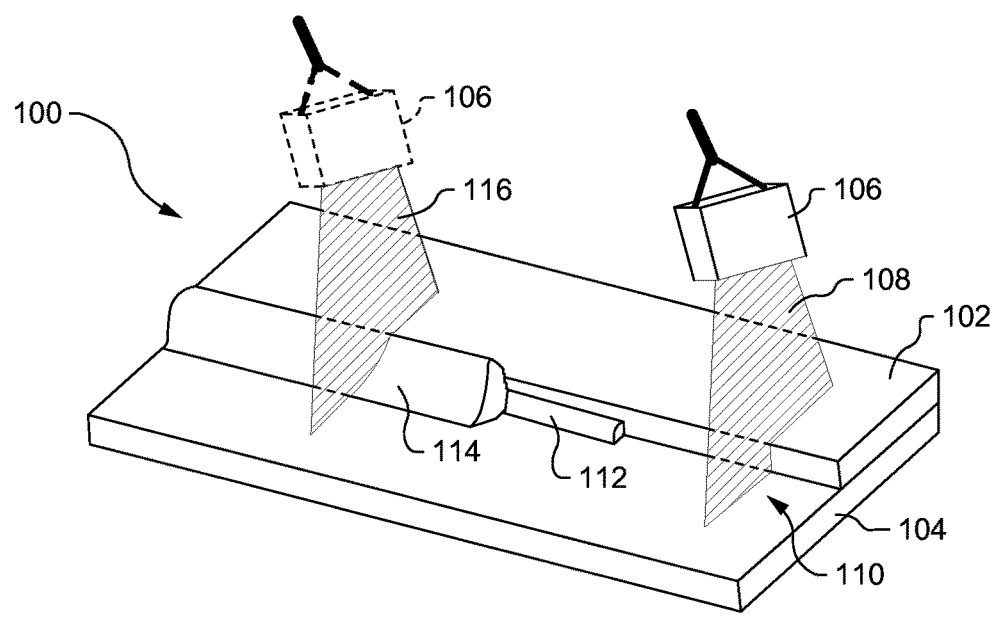
FIG. 1 is a perspective view of a component.

FIG. 1 is a perspective view of a component 100. In an embodiment, the component 100 is a part of an airplane wing. Component 100 may include a first element 102 adjacent to a second element 104. In an embodiment, a sensing tool 106 such as a camera or a laser ranging device uses an optical signal 108 to determine a reference location 110 of the component 100. The reference location 110 is used to position a tool, discussed below, to dispense a compound 112 at a location relative to the reference location 110. In this case, the reference location 110 is designated to be the edge at which a first element 102 intersects a second element 104. A manufacturing operation may cause a compound 112 to be disposed relative to the reference location 110. As can be seen, a secondary operation may dispose another layer of the same or a different compound 114 also relative to the reference location 110. However, during subsequent operations, the sensing tool 106 may be unable to precisely identify the reference location 110 because either or both of the layers of compound 112, 114 have obscured the reference location 110 from the optical signal 116.

Figure 2:
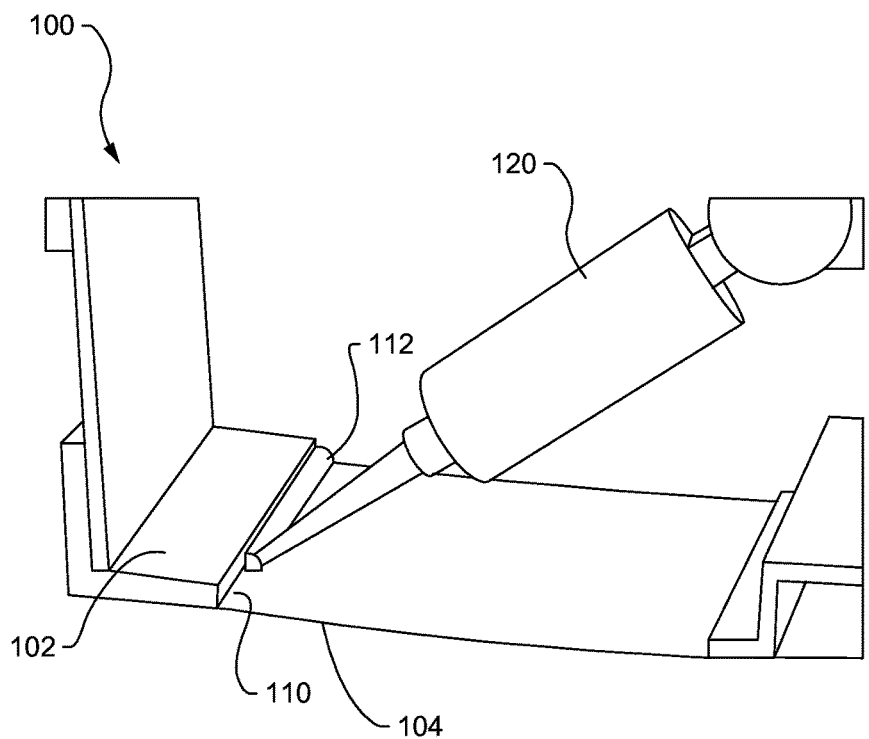
FIG. 2 is another perspective view of the component.

FIG. 2 is another perspective view of the component 100 showing elements 102, 104 and the compound 112 being dispensed by a tool 120. The tool 120 may be an end effector of a robotic arm 121. The robotic arm 121 may be particularly suited for use in a confined space, such as the interior of an airplane wing during assembly operations. In an embodiment, the tool 120 may be adapted to dispense a sealant. In other, embodiments discussed below, the end effector may be capable of different manufacturing operations. The tool 120 is positioned relative to the reference location 110, but, as discussed above, the simple act of adding the compound 112 obscures the reference location 110 and makes it difficult to orient the same tool 120 or another tool with reference to the reference location 110 for subsequent manufacturing operations.

Figure 3:
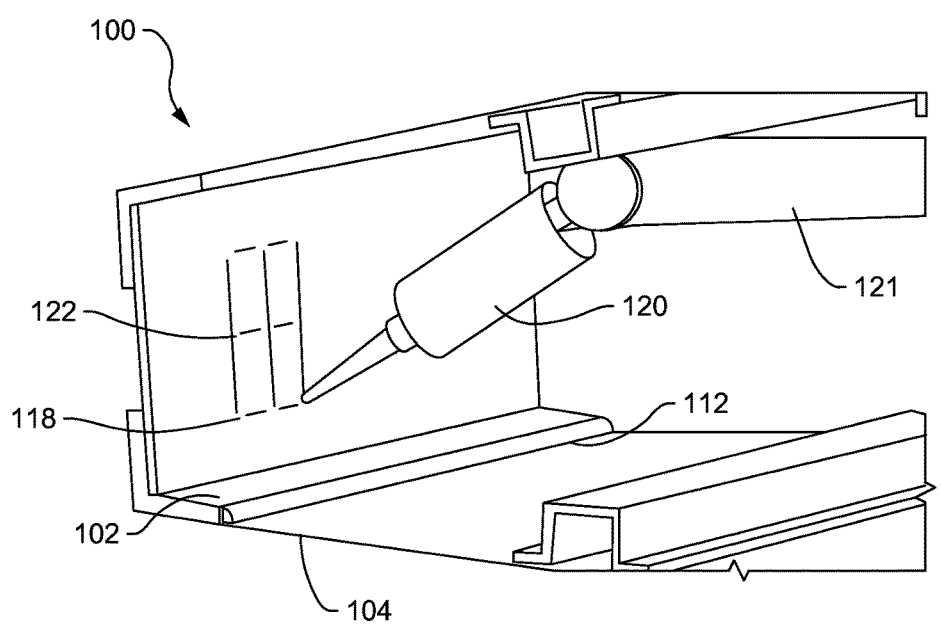
FIG. 3 is a perspective view of the component showing a fiducial mark.

FIG. 3 illustrates a continuation of the operation shown in FIG. 2, where the tool 120 may be used to dispose a fiducial mark 122 on the component 100. Because the tool 120 is initially indexed, or spatially referenced, to the reference location 110 and the tool 120 is managed by a controller that has accurate information about both the location of the reference location 110 and the tool 120 itself, the fiducial mark 122 may be placed with great precision.

The placement of the fiducial mark 122 may occur after one or more sub-manufacturing processes so tolerance build-ups are accounted for and any annealing is complete. Additionally, the compound 112 is necessarily already approved for use in the aircraft being assembled so no additional certifications must be obtained for its use as a fiducial mark. The fiducial mark 122 may be thin but not completely flat, so while the mark 122 adds negligible additional weight, the mark 122 itself may have sufficient dimension to be detected even after coating with another substance, such as a paint or anti-corrosive.

Figure 4:
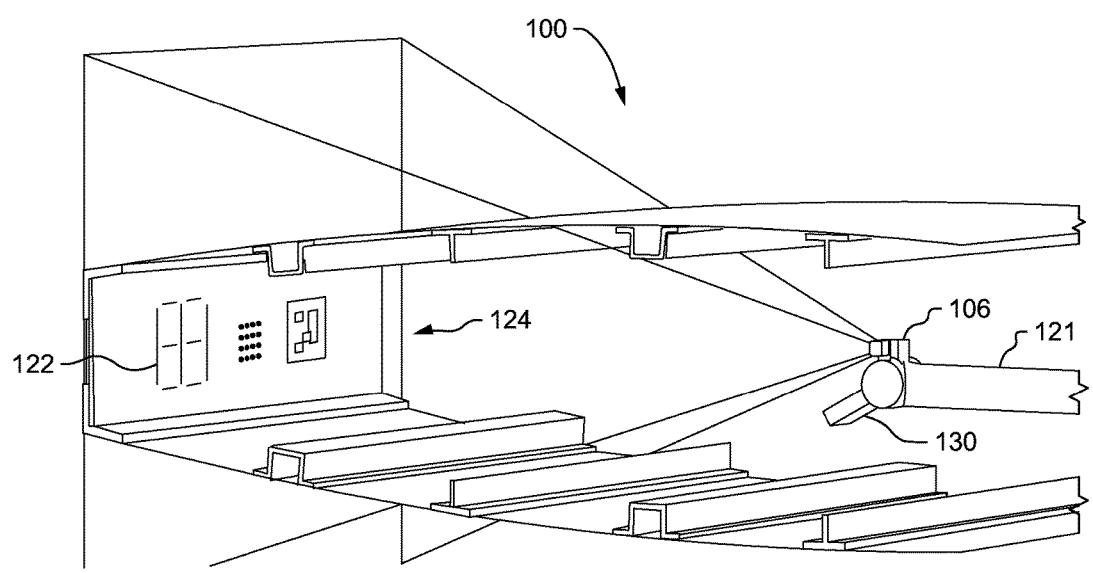
FIG. 4 is a another perspective view of the component showing the fiducial mark.

As illustrated in FIG. 4, the fiducial mark 122 is identified by a sensing tool 106 and used to orient a tool 130 for a subsequent manufacturing operation, such as spraying a coating. Because the fiducial mark 122 was referenced to the original reference location 110, the tool 130 may be oriented effectively with respect to the original reference location 110 even though that area is no longer detectable. Other fiducial marks 124 may be disposed on the component that are either referenced to other locations for different manufacturing operations or are artifacts from previous operations.

Figure 5:
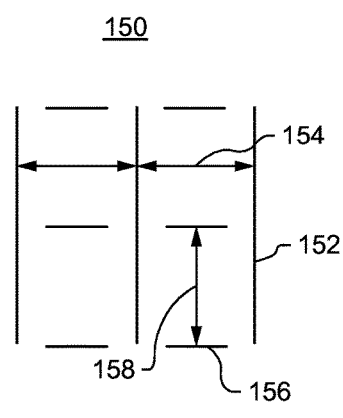
FIG. 5 is a view of a representative fiducial mark.
Figure 6:
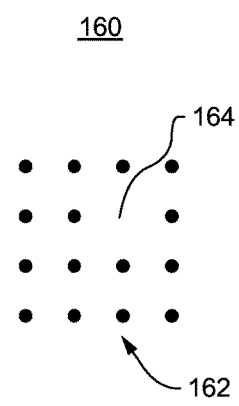
FIG. 6 is a view of another representative fiducial mark.
Figure 7:
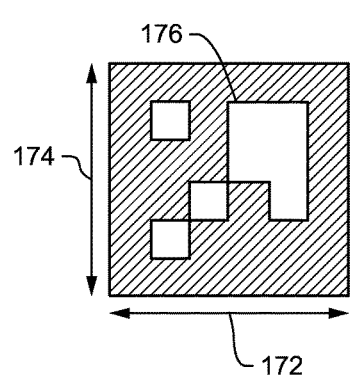
FIG. 7 is a view of yet another representative fiducial mark.

FIGS. 5-7 illustrate exemplary fiducial marks that may be disposed on the component 100. These examples are but a few of many possible types of fiducial marks that may be created using the techniques disclosed herein. FIG. 5 illustrates one such pattern 150. In this embodiment, vertical lines 152 are spaced at a first interval 154 and horizontal lines 156 are spaced at a second interval 158. The pattern with longer vertical lines 152 allows an orientation (up/down) of the pattern 150 to be identified. Because the intervals 154 and 158 are known, the spacing can be used to calibrate dimensions. Because the pattern 150, e.g. fiducial mark 122, was placed at a known location, subsequent manufacturing operations can be indexed relative to the pattern 150.

Another pattern 160 is shown in FIG. 6. In this pattern, a series of dots 162 is modified by leaving out a dot or multiple dots (not depicted). The missing dot 164 can be used to uniquely identify the pattern 160 from other patterns that may be disposed on other areas of the component 100. When the identity of the pattern 160 is determined, its orientation can also be determined using knowledge of how the pattern was disposed.

FIG. 7 shows another pattern 170 that may be used as a fiducial mark. The pattern 170 is an "April Tag" developed by the April Robotics Laboratory of the University of Michigan. In this embodiment, the pattern 170 has known outer dimensions 172 and 174 and a pattern 176 that can be uniquely created for identifying and orienting the pattern 170.

When a sealant or another soft compound is used to create the fiducial mark 122 some droop of the sealant due to gravity may occur, particularly those similar to patterns 150 and 170, so that a bottom edge with respect to gravity of a line, e.g., line 156, may not be accurate. Therefore, when droop is a concern, the top edge of the line may be used for establishing an accurate location identification. Vertical lines with respect to gravity, e.g., line 152 may not be visibly affected by droop and either side edge of a vertical line may also be used for accurate location identification. In an embodiment, location may be established within 30-40 thousandths of an inch although in other applications the location accuracy may be more coarse or much finer, as driven by the requirements of the application and the make-up of the compound from which the fiducial mark is being creating. For example, a computer vision technique may be used to identify the centroid of a dot or other shape in order to recover a more precise position.

The marks may be formed using other techniques, such as drilling holes, dot peening, or even etching, as long as the mark 122 can be sensed in a subsequent manufacturing operation. In an embodiment, the compound 112 may be or include a magnetic ink or other substance so that the mark 122 is sensed by a magnetic field generated by the mark 122.

Figure 8:
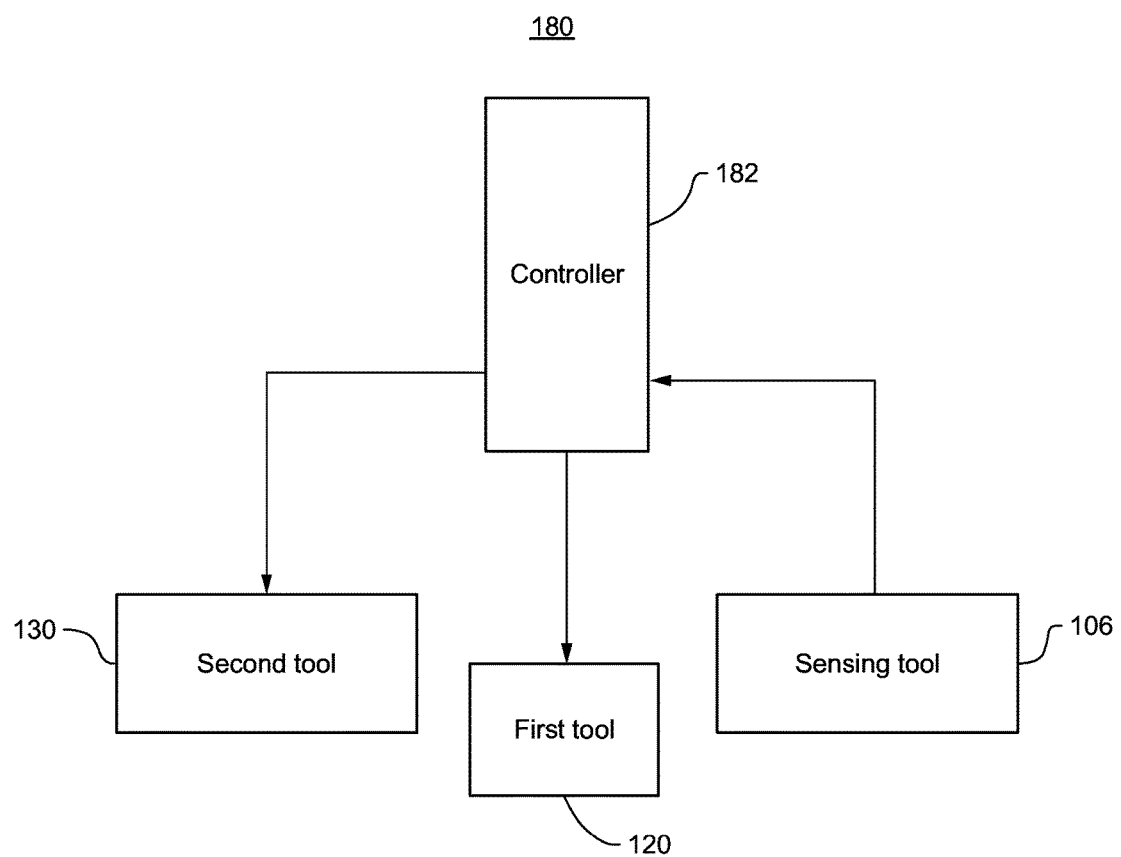
FIG. 8 is a block diagram of a control system in accordance with the current disclosure.

FIG. 8 is a simplified and exemplary block diagram of a control system 180 that may be used for creating and using fiducial marks during a manufacturing operation. The control system 180 includes a controller 182, such as, but not limited to, a dedicated factory automation control system, a local, dedicated controller, or a simple computer with suitable input and output controls. The sensing tool 106 provides information about a feature or reference location 110 on the component 100. The reference location 110 is used by the controller 182 to position a first tool 120 relative to the reference location and initiate a manufacturing operation. The controller 182 may then cause the first tool 120 to dispose a fiducial mark 122 on the component, as discussed above. The controller 182 may also receive a signal from the sensing tool 106 with information that allows the controller 182 to determine the location, and if desired, an identity, of the fiducial mark 122. The controller 182 may then control the first tool 120 and/or a second tool 130 for use in a subsequent manufacturing operation at a location relative the fiducial mark 122.

Figure 9:
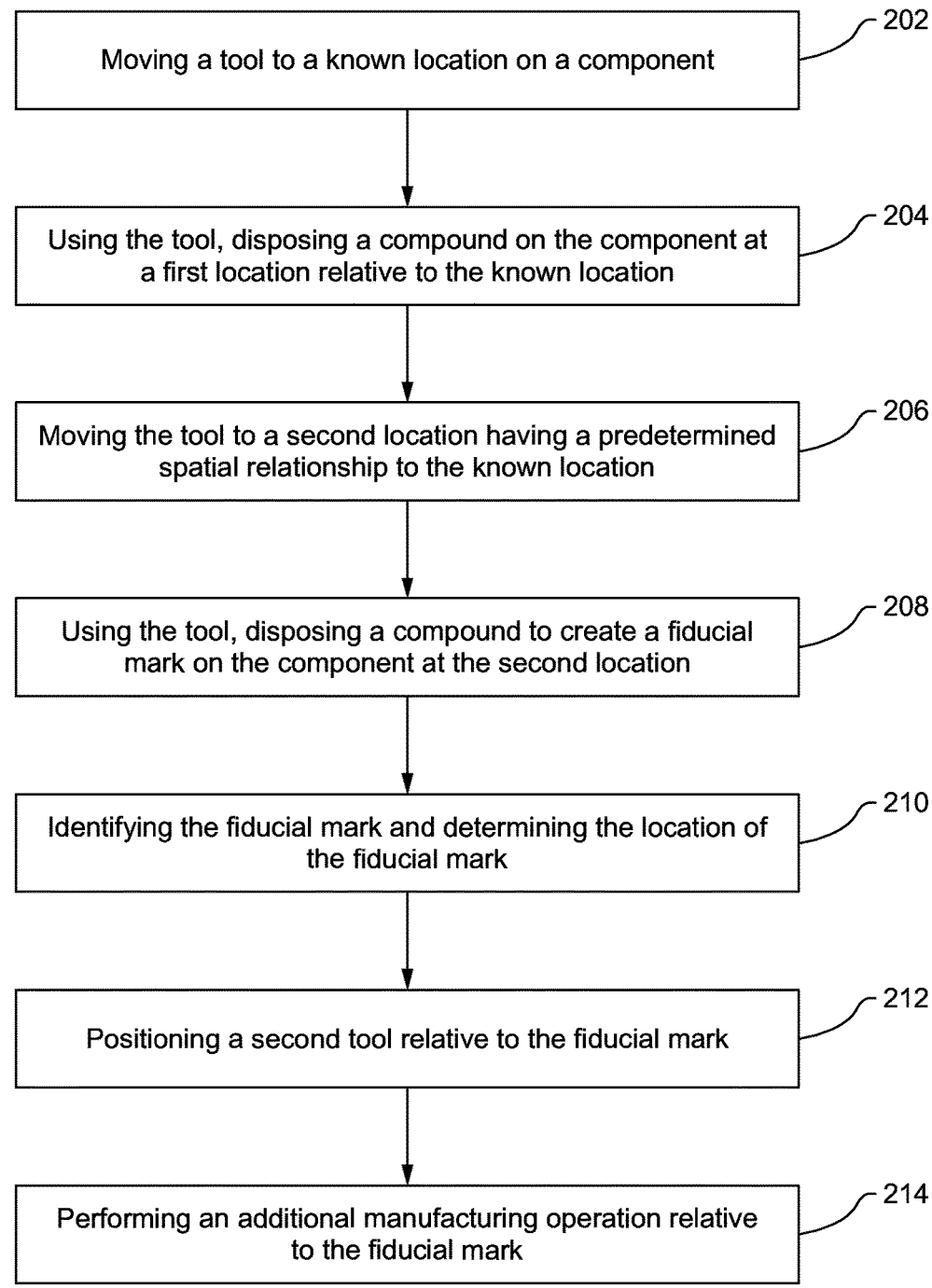
FIG. 9 is an illustration of operations performed by one embodiment of disposing a fiducial mark in accordance with the current disclosure.

FIG. 9 is an illustration 200 of operations performed by one embodiment of disposing fiducial marks in accordance with the current disclosure. At block 202, a tool 120 may be moved to a reference location on the component 100. For example, the reference location 110 may be a feature or may be a single point, such as a post, a hole, a fastener, etc. In various embodiments, the tool 120 may be moved to the reference location 110, or may simply be placed at another location indexed or registered to the reference location 110. For example, if the reference location 110 is a corner, as depicted in FIG. 1, the tool 120 may be moved several centimeters away from the reference location prior to beginning a manufacturing operation.

At block 204, a compound 112 may be disposed on the component 100. In an embodiment, the compound 112 may be a sealant or caulk used to create a liquid-tight seal between a first element 102 and a second element 104. The process of disposing the compound 112 may obscure the reference location 110.

Because the tool 120 was already registered to the reference location 110 at the beginning of the manufacturing operation, at block 206, the tool 120 may be moved to a second location 118 having a predetermined spatial relationship to the reference location 110.

Additional compound may be disposed at block 208 using the tool 120 to create a fiducial mark 122 on the component 100 at the second location 118. In various embodiments, the fiducial mark 122 may be created before or after the manufacturing operation of block 204. In an embodiment, additional operations may be performed, such as, but not limited to, disposing a coating such as paint or sealant over the fiducial mark 122. When the fiducial mark 122 has a distinguishable third dimension, an outline of the features of the fiducial mark 122 may be detectable even though the mark 122 is covered with a uniform coating.

The fiducial mark 122 may be identified and the location of the fiducial mark at block 210. The fiducial mark 122 may be identified by its unique pattern or coding technique, as discussed above with respect to FIGS. 5-7. The fiducial mark 122 may be located using edges of the mark 122, particularly the top and side edges when droop is a potential issue. Additional locations for subsequent manufacturing operations can then be calculated relative to the location 118 of the fiducial mark 122. In other embodiments, different mark types and identification techniques may be used, such as, but not limited to, reflective or magnetic inks, thermally active compounds that can be identified by infrared cameras, magnetic inks, and the like.

At block 212, a second tool 130, or in an embodiment, the first tool 120, may be positioned relative to the fiducial mark 122. For example, the second tool 130 may be a spray gun and the location 118 of the fiducial mark 122 is used as a reference for where to position the second tool 130. While the location of the fiducial mark 122 is used to initially position the second tool 130, an orientation of the fiducial mark 122 may be used to establish a travel path for the second tool 130 during its associated manufacturing operation.

Then, at block 214, additional manufacturing operations, such as applying additional sealant or spraying a coating may be performed using the second tool 130 starting from the position developed at block 212.

The use of an existing manufacturing process and tool 120 to create a fiducial mark 122 on a component 100 addresses the issues discussed above with respect to the use of a fiducial mark 122 on a component 100, particularly in the field of aircraft production. The tool 120 is already being used for an existing operation and the compound 112 or other production material is already certified for use in the aircraft. The fiducial mark 122 may be added after completion of several other manufacturing operations so that any tolerance build up is taken into account and any annealing steps are completed. Minimal weight is added by the fiducial mark 122 but may have sufficient dimension to be detected after subsequent coating by a sealant or other coating. The additional of fiducial marks later in the manufacturing process benefits manufacturers in terms of time and cost savings by delaying addition of fiducial marks during manufacturing of piece parts and sub-assemblies. Another benefit is realized in the reduction of specialized fixtures or jigs that each have their own design and manufacturing costs.

While only certain embodiments have been set forth, alternatives and modifications will be apparent from the above description to those skilled in the art. These and other alternatives are considered equivalents and within the spirit and scope of this disclosure and the appended claims.

What is claimed:

1. A method of creating fiducial marks on a component, the method comprising:
    identifying, with a sensing tool, a reference location on the component;
    moving a tool to a location having a predetermined spatial relationship to the reference location;
    using the tool, disposing a compound to create a fiducial mark on the component at the location;
    identifying, with the sensing tool, the fiducial mark;
    positioning one of the tool or a second tool relative to the identified fiducial mark; and
    using the one of the tool or the second tool, performing a manufacturing operation on the component.

2. The method of claim 1, further comprising disposing a coating over the fiducial mark prior to positioning the one of the tool or the second tool relative to the fiducial mark.

3. The method of claim 1, wherein identifying the fiducial mark comprises identifying a pattern of the fiducial mark.

4. The method of claim 1, further comprising using a sensing system to determine a position of a tool with respect to the fiducial mark.

5. The method of claim 4, further comprising positioning the tool for a manufacturing operation based on the position determination.

6. A method of manufacturing a wing of an airplane, the method comprising:
    identifying a first location on the wing;
    performing a manufacturing operation using a tool spatially positioned relative to the first location;
    creating a fiducial mark using the tool at a second location with a known spatial relationship to the first location;
    identifying the fiducial mark with a sensing system;
    determining a position of a tool with respect to the fiducial mark; and
    positioning the tool for a manufacturing operation based on the determined position.

7. The method of claim 6, further comprising disposing a coating over the fiducial mark prior to identifying the fiducial mark.

8. The method of claim 6, wherein identifying the fiducial mark comprises sensing a magnetic field generated by the fiducial mark.

9. The method of claim 6, wherein identifying the fiducial mark comprises identifying a top edge and a side edge of the fiducial mark.

* * * * *